United States Patent
Zhou et al.

(10) Patent No.: US 8,883,356 B2
(45) Date of Patent: Nov. 11, 2014

(54) ELECTROLYTE FOR LITHIUM BATTERIES

(75) Inventors: GuiShu Zhou, Shenzhen (CN); Lei Si, Shenzhen (CN); Yong Wang, Shenzhen (CN); YiWei Fan, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 784 days.

(21) Appl. No.: 12/482,690

(22) Filed: Jun. 11, 2009

(65) Prior Publication Data

US 2010/0028771 A1    Feb. 4, 2010

(30) Foreign Application Priority Data

Jul. 30, 2008   (CN) .......................... 2008 1 0142212

(51) Int. Cl.
| | | |
|---|---|---|
| *H01M 6/18* | (2006.01) | |
| *H01M 10/052* | (2010.01) | |
| *H01M 10/0567* | (2010.01) | |
| *H01M 10/0568* | (2010.01) | |
| *H01M 10/0569* | (2010.01) | |

(52) U.S. Cl.
CPC ........ *H01M 10/052* (2013.01); *H01M 10/0567* (2013.01); *H01M 10/0568* (2013.01); *H01M 10/0569* (2013.01); *H01M 2300/0025* (2013.01); *H01M 2300/0031* (2013.01); *H01M 2300/0034* (2013.01); *Y02E 60/122* (2013.01)
USPC ........... 429/307; 429/330; 429/331; 429/200; 429/199; 429/340; 429/329; 252/62.2; 29/623.2

(58) Field of Classification Search
CPC ..................... H01M 10/0567; H01M 10/0568; H01M 10/0569; H01M 10/052; H01M 2300/0025; Y02E 60/122
USPC ......... 429/331, 330, 200, 199, 340, 329, 307; 252/62.2; 29/623.2
See application file for complete search history.

(56) References Cited

U.S. PATENT DOCUMENTS

| | | | |
|---|---|---|---|
| 3,778,307 | A | 12/1973 | Beer et al. |
| 4,394,280 | A | 7/1983 | von Alpen et al. |
| 5,910,382 | A | 6/1999 | Goodenough et al. |
| 6,010,806 | A | 1/2000 | Yokoyama et al. |
| 6,180,800 | B1 | 1/2001 | Yokoyama et al. |
| 6,514,640 | B1 | 2/2003 | Armand et al. |
| 6,558,844 | B2 | 5/2003 | Howard, Jr. et al. |
| 6,645,452 | B1 | 11/2003 | Barker et al. |
| 6,702,961 | B2 | 3/2004 | Barket et al. |
| 6,835,500 | B2 | 12/2004 | Masquelier et al. |
| 6,960,331 | B2 | 11/2005 | Barket et al. |
| 6,964,830 | B2 | 11/2005 | Takahashi |
| 7,025,907 | B2 | 4/2006 | Kahzaki et al. |
| 7,172,834 | B1 | 2/2007 | Jow et al. |
| 7,189,475 | B2 | 3/2007 | Sasaki et al. |
| 7,255,965 | B2 | 8/2007 | Xu et al. |
| 7,261,979 | B2 | 8/2007 | Gozdz et al. |
| 7,338,734 | B2 | 3/2008 | Chian et al. |
| 7,695,863 | B2 * | 4/2010 | Abe et al. ........................ 429/200 |
| 7,722,848 | B2 | 5/2010 | Dai et al. |
| 2002/0047112 | A1 | 4/2002 | Hosoya et al. |
| 2002/0102459 | A1 | 8/2002 | Hosoya et al. |
| 2004/0151649 | A1 | 8/2004 | Hemmer et al. |
| 2006/0078801 | A1 | 4/2006 | Yamaguchi et al. |
| 2006/0083990 | A1 | 4/2006 | Adamson et al. |
| 2006/0228626 | A1 | 10/2006 | Kawashima et al. |
| 2006/0236528 | A1 | 10/2006 | Xu et al. |
| 2007/0160752 | A1 | 7/2007 | Mao |
| 2007/0166609 | A1 | 7/2007 | Lee et al. |
| 2007/0178370 | A1 | 8/2007 | Amine et al. |
| 2007/0184352 | A1 | 8/2007 | Donoue et al. |
| 2007/0207080 | A1 | 9/2007 | Yang |
| 2007/0212606 | A1 | 9/2007 | Chang |
| 2008/0286657 | A1 * | 11/2008 | Hasegawa et al. ............ 429/338 |
| 2009/0081102 | A1 | 3/2009 | Dai |
| 2009/0106970 | A1 | 4/2009 | Fan |
| 2009/0142663 | A1 * | 6/2009 | Takeuchi et al. ............... 429/188 |
| 2009/0148765 | A1 | 6/2009 | Cao et al. |
| 2009/0169984 | A1 | 7/2009 | Liang et al. |
| 2009/0191455 | A1 | 7/2009 | Gao et al. |
| 2009/0217512 | A1 | 9/2009 | Tian et al. |
| 2009/0217513 | A1 | 9/2009 | Xi et al. |
| 2009/0220856 | A1 | 9/2009 | Tian et al. |
| 2009/0220858 | A1 | 9/2009 | Cheng |
| 2009/0220860 | A1 | 9/2009 | Xi et al. |

(Continued)

FOREIGN PATENT DOCUMENTS

| | | |
|---|---|---|
| CN | 1259773 | 7/2000 |
| CN | 1401559 | 3/2003 |

(Continued)

OTHER PUBLICATIONS

Related U.S. Appl. No. 12/035,978, entitled "Lithium Iron Phosphate Cathode Material," Final Office Action (mailed Dec. 7, 2009).

(Continued)

*Primary Examiner* — Laura Weiner
(74) *Attorney, Agent, or Firm* — Greenberg Traurig, LLP

(57) ABSTRACT

Electrolyte and lithium secondary batteries containing the same are disclosed. In one instance, the electrolyte includes a lithium salt, a solvent and an additive. In some examples, the additive includes substances A, B and C, wherein substance A is vinylene carbonate, substance B includes at least one of fluorinated or chlorinated ethylene carbonate or diethylene carbonate, and substance C includes at least one of ethylene sulfite, 1,3-propanesultone and propenyl sulfite.

17 Claims, No Drawings

(56) References Cited

U.S. PATENT DOCUMENTS

| | | | |
|---|---|---|---|
| 2009/0302283 A1 | 12/2009 | Xia et al. | |
| 2010/0059706 A1 | 3/2010 | Dai et al. | |
| 2010/0062339 A1 | 3/2010 | Pan et al. | |
| 2010/0167121 A1* | 7/2010 | Arai et al. | 429/188 |

FOREIGN PATENT DOCUMENTS

| | | | |
|---|---|---|---|
| CN | 1410349 | | 4/2003 |
| CN | 1424980 | | 6/2003 |
| CN | 1559889 | | 1/2005 |
| CN | 1641912 | | 7/2005 |
| CN | 1648036 | | 8/2005 |
| CN | 1677718 | | 10/2005 |
| CN | 1762798 | | 4/2006 |
| CN | 1773754 | | 5/2006 |
| CN | 1775665 | | 5/2006 |
| CN | 1797823 | | 7/2006 |
| CN | 1925206 | * | 3/2007 |
| CN | 1964125 | | 5/2007 |
| CN | 1986395 | | 6/2007 |
| CN | 1989649 | | 6/2007 |
| CN | 101047268 | | 10/2007 |
| CN | 101087021 | | 12/2007 |
| CN | 101106189 | | 1/2008 |
| CN | 101128950 | | 2/2008 |
| CN | 101207197 | | 6/2008 |
| CN | 101209827 | | 7/2008 |
| CN | 101212048 | | 7/2008 |
| CN | 101399343 | | 4/2009 |
| CN | 101420048 | | 4/2009 |
| CN | 101453019 | | 6/2009 |
| CN | 101471432 | | 7/2009 |
| CN | 101478041 | | 7/2009 |
| CN | 101478042 | | 7/2009 |
| CN | 101494305 | | 7/2009 |
| EP | 1146586 A2 | | 10/2001 |
| EP | 1553647 | | 7/2005 |
| EP | 1855334 | | 11/2007 |
| WO | 9740541 | | 10/1997 |
| WO | 2005076936 | | 8/2005 |
| WO | 2006066470 | | 6/2006 |
| WO | 2006112674 | | 10/2006 |
| WO | 2008109734 | | 9/2008 |

OTHER PUBLICATIONS

USPTO Transaction History of related U.S. Appl. No. 12/035,978, filed Feb. 22, 2008, entitled "Lithium Iron Phosphate Cathode Material."
USPTO Transaction History of related U.S. Appl. No. 12/040,773, filed Feb. 29, 2008, entitled "Composite Compound with Mixed Crystalline Structure."
USPTO Transaction History of related U.S. Appl. No. 12/053,308, filed Mar. 21, 2008, entitled "Cathode Materials for Lithium Batteries."
USPTO Transaction History of related U.S. Appl. No. 12/127,431, filed May 27, 2008, entitled "Lithium Iron Phosphate Cathode Material."
USPTO Transaction History of related U.S. Appl. No. 12/198,087, filed Aug. 25, 2008, entitled "Lithium-Ion Rechargeable Battery Preparation."
USPTO Transaction History of related U.S. Appl. No. 12/254,537, filed Oct. 20, 2008, entitled "Lithium Iron(II) Phosphate Cathode Active Material."
USPTO Composite Transaction History of related U.S. Appl. No. 12/273,649, filed Nov. 19, 2008, entitled "Composite Separator Films for Lithium-Ion Batteries."
USPTO Transaction History of related U.S. Appl. No. 12/316,165, filed Dec. 9, 2008, entitled "Composite Compound with Mixed Crystalline Structure."
USPTO Transaction History of related U.S. Appl. No. 12/316,173, filed Dec. 9, 2008, entitled "Composite Compound with Mixed Crystalline Structure."
USPTO Transaction History of related U.S. Appl. No. 12/316,180, filed Dec. 9, 2008, entitled "Composite Compound with Mixed Crystalline Structure."
USPTO Transaction History of related U.S. Appl. No. 12/316,234, filed Dec. 9, 2008, entitled "Composite Compound with Mixed Crystalline Structure."
USPTO Transaction History of related U.S. Appl. No. 12/352,981, filed Jan. 13, 2009, entitled "Electrolyte for Batteries and Battery Packs."
USPTO Transaction History of related U.S. Appl. No. 12/436,347, filed May 6, 2009, entitled "Transition Metal Hydroxide and Oxide, Method of Producing the Same, and Cathode Material Containing the Same."
European Search Report for EP09400001 (mailed Apr. 14, 2009).
Hu, Huan-yu et al., "Influenece of the Mg-substitution on electrochemical performances of LiFePO4," China Academic Journal Electronic Publishing House, pp. 18-20, vol. 30, No. 1, 2006.
International Patent Application Serial No. PCT/CN08/70391, International Search Report and Written Opinion (mailed Jul. 17, 2008).
Pei, Su-hua et al., "Sensitivity of $TiO^2$ : NB2O5 composite crystalliod to trimethylamine", Journal of Functional Materials and Devices, vol. 12, No. 3, Jun. 2006.
Related U.S. Appl. No. 12/035,978, entitled "Lithium Iron Phosphate Cathode Material ," Non-Final Office Action (mailed Apr. 27, 2009).
Related U.S. Appl. No. 12/035,978, entitled "Lithium Iron Phosphate Cathode Material ," Non-Final Office Action (mailed Oct. 2, 2008).
Related U.S. Appl. No. 12/035,978, entitled "Lithium Iron Phosphate Cathode Material," Final Office Action (mailed Jan. 9, 2009).
Related U.S. Appl. No. 12/127,431, entitled "Lithium Iron-Phosphate Cathode Material," Final Office Action (mailed Jun. 26, 2009).
Related U.S. Appl. No. 12/127,431, entitled "Lithium Iron-Phosphate Cathode Material," Non-Final Office Action (mailed Jan. 30, 2009).
Yun et al., "Synthesis and electrochemcial properties of olivine-type LiFe PO4/C composite cathode material prepared from a poly(vinyl alcohol)-containg precursor." Journal of Power Sources vol. 160, issue 2, Oct. 2006, pp. 1361-1368 (Available online May 9, 2006).
Related U.S. Appl. No. 12/127,431, entitled "Lithium Iron-Phosphate Cathode Material," Non-Final Office Action (mailed Oct. 20, 2009).
Patent Cooperation Treaty; PCT International Search Report; Sep. 17, 2009; 4 pages; China.
Abstract Translation of WO2007043624; Apr. 19, 2007; 1 page.
Abstract Translation of JP2007194037; 1 page; Japan.
Abstract Translation of JP2006294519; 1 page; Japan.
Abstract Translation of JP2006004649; 1 page; Japan.
Abstract Translation of JP2004158213; Jun. 3, 2004; 1 page; Japan.
Abstract Translation of CN101394007; 1 page; China.
Abstract Translation of CN101213703; 1 page; China.
Abstract Translation of CN101138125; 1 page; China.
Abstract Translation of CN101093901; 1 page; China.
Abstract Translation of CN101093900; 1 page; China.
Abstract Translation of CN1925206; 1 page; China.
Abstract Translation of CN1161036; 1 page; China.

* cited by examiner

ELECTROLYTE FOR LITHIUM BATTERIES

CROSS-REFERENCE TO RELATED APPLICATION

This application claims priority to Chinese Patent Application No. 200810142212.8, filed Jul. 30, 2008.

BACKGROUND

Because of its high voltage and high energy density, lithium secondary batteries are widely used in various mobile electronic devices and electric tools. However, with rapidly demanding performance of portable devices on the rise, lithium-ion batteries having higher capacity, longer life and higher energy density remain challenging. Furthermore, the increasing demand places additional requirement on safety, security and performance of these batteries.

SUMMARY

Electrolytes and lithium secondary batteries containing the same are disclosed. One embodiment discloses an electrolyte having a lithium salt, a solvent, and an additive. In one embodiment, the additive includes substances A, B and C. In one embodiment, substance A has the following chemical structure:

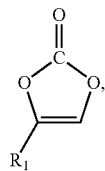

with $R_1$ representing a straight-chain alkane having the general formula $C_nH_{2n+1}$ ($0 \leq n \leq 3$). In one embodiment, substance B has the chemical structure of at least one of

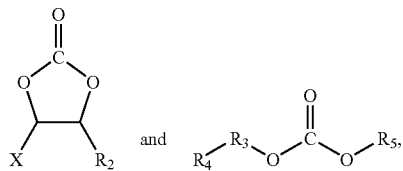

with $R_2$ representing a straight-chain alkane having the general formula $C_nH_{2n+1}$ ($0 \leq n \leq 3$), with $R_3$ representing a straight-chain alkane having the general formula $C_nH_{2n}$ ($1 \leq n \leq 4$), with $R_4$ representing a straight-chain alkane having the general formula $C_nH_{2n+1-a}Y_a$ ($0 \leq n \leq 4$), with $R_5$ representing a straight-chain alkane having the general formula $C_nH_{2n+1-b}Z_b$ ($0 \leq n \leq 3$), where X, Y and Z is selected from at least one of F and Cl, and where a and b is greater than or equal to 0, but not equal to 0 at the same time. In one embodiment, substance C includes at least one of ethylene sulfite, 1,3-propane sultone and propenyl sulfite.

In one embodiment, the solvent includes at least two members selected from the group consisting essentially of ethylene carbonate, propylene carbonate, diethylene carbonate and γ-butyrolactone. In one embodiment, the amount of additive can be from about 5% to about 40% of the electrolyte by weight. In some embodiments, the amount of substance A can be from about 0.1% to about 10% of the electrolyte by weight, the amount of substance B can be from about 0.5% to about 25% of the electrolyte by weight, and the amount of substance C can be from about 1% to about 15% of the electrolyte by weight.

In some embodiments, substance A is vinylene carbonate and $R_1$=H, substance B is at least one of fluorinated ethylene carbonate, chloro-substituted ethylene carbonate, fluorinated diethylene carbonate and chloro-substituted diethylene carbonate, and where $R_2$H, $R_3$=$CH_2$, $R_4$=$CH_3$ and $R_5$=$C_2H_4Z$. In one embodiment, substance A is vinylene carbonate and $R_1$=H, substance B is fluorinated ethylene carbonate, and substance C is propenyl sulfite. In some embodiments, the lithium salt includes at least one of lithium perchlorate ($LiClO_4$), lithium tetrafluoroborate ($LiBF_4$), lithium bis(oxalato)borate (LiBOB), and lithium hexafluorophosphate ($LiPF_6$).

One embodiment discloses a lithium battery having a shell, a battery core disposed within the shell, and an electrolyte. In this embodiment, the battery core includes an anode, a cathode and a separator disposed between the anode and the cathode. In some embodiments, the electrolyte may include the electrolyte embodiments disclosed herein.

Methods of producing an electrolyte and lithium secondary batteries containing the same are disclosed, where the electrolyte can be produced by mixing lithium salt and an additive to a solvent. In some embodiments, the additive includes the additive embodiments disclosed herein. In other embodiments, the electrolyte includes the electrolyte embodiments disclosed herein. Additionally, a lithium secondary battery can be produced by situating a separator film between a cathode and an anode to form a battery core, which can be disposed within a shell. An electrolyte may be injected within the shell, wherein the electrolyte can be produced using the methods disclosed herein. The electrolyte and the battery core may be sealed within the shell to form the lithium secondary battery.

Other variations, embodiments and features of the present disclosure will become evident from the following detailed description, drawings and claims.

DETAILED DESCRIPTION

It will be appreciated by those of ordinary skill in the art that the disclosure can be embodied in other specific forms without departing from the spirit or essential character thereof. The presently disclosed embodiments are therefore considered in all respects to be illustrative and not restrictive.

One embodiment discloses an electrolyte for lithium batteries having a lithium salt, a solvent, and an additive. In one embodiment, the additive includes substances A, B and C. In one example, substance A has the chemical structure

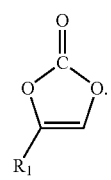

In one example, substance B has the chemical structure of at least one of

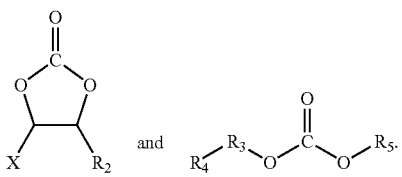

In one example, substance C includes at least one of ethylene sulfite (ES), 1,3-propane sultone (1,3-PS) and propenyl sulfite (PS).

In one embodiment, $R_1$ is a straight-chain alkane having the general formula $C_nH_{2n+1}$, wherein $0 \leq n \leq 3$. In one embodiment, $R_2$ is a straight-chain alkane having the general formula $C_nH_{2n+1}$, wherein $0 \leq n \leq 3$. In one embodiment, $R_3$ is a straight-chain alkane having the general formula $C_nH_{2n}$, wherein $1 \leq n \leq 4$. In one embodiment, $R_4$ is a straight-chain alkane having the general formula $C_nH_{2n+1-a}Y_a$, wherein $0 \leq n \leq 4$. In one embodiment, $R_5$ is a straight-chain alkane having the general formula $C_nH_{2n+1-b}Z_b$, wherein $0 \leq n \leq 3$. In some embodiments, X, Y and Z is selected from at least one of F and Cl, and a and b is greater than or equal to 0, but not equal to 0 at the same time.

In one embodiment, the amount of additives can be from about 5% to about 40% of the electrolyte by weight. In another embodiment, the amount of additives can be from about 8% to about 25% of the electrolyte by weight.

In one embodiment, the amount of substance A can be from about 0.1% to about 10% of the electrolyte by weight. In the alternative, the amount of substance A can be from about 0.5% to about 8% of the electrolyte by weight. In one embodiment, the amount of substance B can be from about 0.5% to about 25% of the electrolyte by weight. In the alternative, the amount of substance B can be from about 3% to about 15% of the electrolyte by weight. In one embodiment, the amount of substance C can be from about 1% to about 15% of the electrolyte by weight. In the alternative, the amount of substance C can be from about 3% to about 10% of the electrolyte by weight.

In some embodiments, substance A is vinylene carbonate (VC) and $R_1$=H, substance B is at least one of fluorinated ethylene carbonate (F-EC), chloro-substituted ethylene carbonate (Cl-EC), fluorinated diethylene carbonate (F-DEC) and chloro-substituted diethylene carbonate (Cl-DEC), and $R_2$=H, $R_3$=CH$_2$, $R_4$=CH$_3$ and $R_5$=C$_2$H$_4$Z. In one embodiment, substance B is fluorinated ethylene carbonate (F-EC) and substance C is propenyl sulfite (PS).

In some embodiments, the solvent includes at least two members selected from the group consisting essentially of ethylene carbonate (EC), propylene carbonate (PC), diethylene carbonate (DEC) and γ-butyrolactone (GBL).

In one example, the solvent is a single chemical compound having the following properties: boiling point $\geq 120°$ C., flash point $\geq 25°$ C., electrochemical oxidation potential: $\Phi_{ox} > 3.0$ V with respect to saturated calomel electrode (SCE), and electrochemical reduction potential: $\Phi_{red} < 2.8$ V (vs. SCE). In another example, the solvent includes a combination of EC, DEC and GBL, wherein the weight ratio of EC:DEC:GBL is about 2:2:1.

In one embodiment, the lithium salt includes at least one of lithium perchlorate (LiClO$_4$), lithium tetrafluoroborate (LiBF$_4$), lithium bis(oxalato)borate (LiBOB), and lithium hexafluorophosphate (LiPF$_6$). In one example, the lithium salt is LiPF$_6$ having a concentration of from about 0.7 mol/L to about 1.3 mol/L.

One embodiment discloses a lithium secondary battery having a shell and a battery core disposed therein, and an electrolyte. In one embodiment, the battery core includes cathode, anode, a separator between the anode and the cathode, among other components. In some instances, the separator has the ability to insulate and maintain liquids within, the types of separator including without limitation polypropylene (PP), polyethylene (PE), polypolyolefin microporous membrane, polyethylene felt, fiberglass felt and ultra-fine fiberglass paper. In one example, the shell includes an anti-exploding indentation. In some embodiments, the electrolyte includes the electrolyte embodiments disclosed herein, among others. There are no limitations other parts and structures of the lithium secondary battery.

In one example, the cathode includes a cathode material, a conductive agent, and an adhesive. In some embodiments, the types of cathode material include without limitation at least one of lithium cobalt oxide, lithium nickel oxide, lithium manganese oxide and lithium iron phosphate. In some embodiments, the types of conductive agent include without limitation at least one of carbon nano-tube, nano-silver powder, acetylene black, graphite powder and carbon black. In one embodiment, the amount of conductive agent can be from about 0.1% to about 10% of the cathode material by weight. In some embodiments, the types of adhesive include without limitation at least one of polytetrafluoroethylene (PTFE), polyvinylidene fluoride (PVDF), hydroxymethyl cellulose (CMC), methylcellulose (MC) and styrene-butadiene rubber (SBR). In one embodiment, the amount of adhesive can be from about 0.1% to about 5% of the cathode material by weight.

In one example, the anode includes a conductive agent and an adhesive. In some embodiments, the types of conductive agent include without limitation at least one of carbon nano-tube, nano-silver powder, acetylene black, graphite powder and carbon black. In some embodiments, the types of adhesive include without limitation at least one of polytetrafluoroethylene (PTFE), polyvinylidene fluoride (PVDF), hydroxymethyl cellulose (CMC), methylcellulose (MC) and styrene-butadiene rubber (SBR).

In some embodiments, the solvent for preparing the slurry for the cathode and the anode includes without limitation at least one of N-methyl pyrrolidone (NMP), dimethylformamide (DMF), diethylformamide (DEF), dimethyl sulfoxide (DMSO), tetrahydrofuran (THF), water, alcohol and mixtures thereof. In one example, the amount of solvent to be used can be enough for coating the slurry onto the base and collector. In other examples, the amount of solvent can be from about 100% to about 150% by weight of the cathode or anode active materials.

One embodiment discloses a method of preparing a lithium-ion secondary battery including situating the separator between the cathode and the anode to form a battery core, which can be housed within a shell. The electrolyte can be injected within the shell and sealed to form the lithium-ion secondary battery. In one embodiment, a method of preparing the cathode includes mixing a slurry coating of cathode material, adhesive and conductive agent on a current collector, drying, pressing or rolling, and slicing to form the cathode. In some embodiments, the types of current collector include without limitation aluminum foil, copper foil and steel strip with nickel plating, among others. In one embodiment, a method of preparing the anode is substantially similar in all respect to that of preparing the cathode with the exception that conductive agents and adhesives for anodes are utilized.

The following examples provide additional details of the electrolyte embodiments of the present disclosure.

EXAMPLE 1

(1) Preparation of the Electrolyte

Prepare a mixture containing about 87.5 grams of EC, DEC and GBL at a weight ratio of about 2:2:1. Add about 12.5 grams of $LiPF_6$ to the mixture. Mix an additive containing about 1.5 grams of VC, about 3 grams of F-EC and about 3.5 grams of PS to the mixture, process the mixture through granular molecular sieve (microporous pores) for absorbing water content. Allow the mixture to stand for about 24 hours and filter out the molecular sieve. In this electrolyte, the amount of VC is about 1.5% of the electrolyte by weight, the amount of F-EC is about 3% of the electrolyte by weight, and the amount of PS is about 3.5% of the electrolyte by weight.

(2) Preparation of the Cathode

Mix about 8.7 grams of NMP, about 1000 grams of acetylene black and about 300 grams of PVDF powder, stir for about 5 minutes to obtain a slurry. Add about 3 kilograms of NMP and about 5 kilograms of lithium cobalt oxide (Hunan Ruixiang New Materials Co., LTD, China) to about 2 kilograms of the slurry, and stir for about 200 minutes to obtain a cathode material. Coat the cathode material on an aluminum foil current collector, the thickness of the aluminum foil being about 20 microns. Dry, press and cut the aluminum foil to obtain a cathode plate having a dimension of about 360 mm by about 44 mm by about 0.15 mm. Apply about 5.4 grams to about 5.6 grams of the lithium cobalt cathode material on the cathode plate.

(3) Preparation of the Anode

Mix about 3 kilograms of natural graphite, about 90 grams of SBR, about 90 grams of CMC and about 3 kilograms of water, stir to obtain an anode slurry. Coat the anode slurry on a copper foil, the thickness of the copper foil being about 20 microns. Dry at about 120° C., press and cut the copper foil to obtain an anode plate having a dimension of about 410 mm by about 45 mm by about 0.18 mm. Apply about 2.7 grams to about 2.8 grams of the natural graphite anode material on the anode plate.

(4) Preparation of the Battery

Take the cathode and anode produced herein, together with a PP or PE separator film, and wind the cathode, anode and separator film to form a square-shaped lithium-ion battery core, which can be housed within a shell. The electrolyte (about 3 grams) produced herein may be injected into the shell and air-sealed to provide a lithium-ion battery. The lithium-ion battery produced is labeled A1.

In some embodiments, the lithium-ion battery may be an LP053450A or OEM compatible type battery. In other embodiments, the cathode, anode and separator film may be wounded and housed within a shell. The electrolyte may be injected into the shell and air-sealed to provide an ISO 9001, RoHS or CE certified lithium-ion battery, among other standards, certifications and compliances. In one embodiment, the design capacity of the battery has about 1 C equal to about 720 mAh. In another embodiment, the design capacity of the battery is about 3.7 V and about 750 mAh.

EXAMPLE 2

Substantially similar in all respect to that of EXAMPLE 1 except that the mixture additive in the electrolyte includes about 2 grams of VC, about 7 grams of F-EC and about 4 grams of PS. In this example, the amount of VC is about 2% of the electrolyte by weight, the amount of F-EC is about 7% of the electrolyte by weight, and the amount of PS is about 4% of the electrolyte by weight. The lithium-ion battery produced is labeled A2.

EXAMPLE 3

Substantially similar in all respect to that of EXAMPLE 1 except that the mixture additive in the electrolyte includes about 0.3 gram of VC, about 1.5 grams of F-EC and about 1.2 grams of PS. In this example, the amount of VC is about 0.3% of the electrolyte by weight, the amount of F-EC is about 1.5% of the electrolyte by weight, and the amount of PS is about 1.2% of the electrolyte by weight. The lithium-ion battery produced is labeled A3.

EXAMPLE 4

Substantially similar in all respect to that of EXAMPLE 1 except that the mixture additive in the electrolyte includes about 8 grams of VC, about 0.5 gram of F-EC and about 3 grams of 1,3-PS. In this example, the amount of VC is about 8% of the electrolyte by weight, the amount of F-EC is about 0.5% of the electrolyte by weight, and the amount of 1,3-PS is about 3% of the electrolyte by weight. The lithium-ion battery produced is labeled A4.

EXAMPLE 5

Substantially similar in all respect to that of EXAMPLE 1 except that the mixture additive in the electrolyte includes about 4 grams of VC, about 6 grams of F-EC and about 2 grams of PS. In this example, the amount of VC is about 4% of the electrolyte by weight, the amount of F-EC is about 6% of the electrolyte by weight, and the amount of PS is about 2% of the electrolyte by weight. The lithium-ion battery produced is labeled A5.

EXAMPLE 6

Substantially similar in all respect to that of EXAMPLE 1 except that the mixture additive in the electrolyte includes about 8 grams of VC, about 10 grams of F-EC and about 6 grams of 1,3-PS. In this example, the amount of VC is about 8% of the electrolyte by weight, the amount of F-EC is about 10% of the electrolyte by weight, and the amount of 1,3-PS is about 6% of the electrolyte by weight. The lithium-ion battery produced is labeled A6.

EXAMPLE 7

Substantially similar in all respect to that of Example 1 except that the mixture additive in the electrolyte includes about 5 grams of VC, 3 grams of F-DEC and 10 grams of PS. In this example, the amount of VC is about 5% of the electrolyte by weight, the amount of F-DEC is about 3% of the electrolyte by weight, and the amount of PS is about 10% of the electrolyte by weight. The lithium-ion battery produced is labeled A7.

EXAMPLE 8

Substantially similar in all respect to that of Example 1 except that the mixture additive in the electrolyte includes about 5 grams of VC, about 22 grams of F-EC and about 13 grams of 1,3-PS. In this example, the amount of VC is about 5% of the electrolyte by weight, the amount of F-EC is about 22% of the electrolyte by weight, and the amount of 1,3-PS is about 13% of the electrolyte by weight. The lithium-ion battery produced is labeled A8.

EXAMPLE 9

Substantially similar in all respect to that of Example 1 except that the mixture additive in the electrolyte includes about 0.5 gram of VC, about 8 grams of F-EC and about 1.5 grams of ES. In this example, the amount of VC is about 0.5% of the electrolyte by weight, the amount of F-EC is about 8% of the electrolyte by weight, and the amount of ES is about 1.5% of the electrolyte by weight. The lithium-ion battery produced is labeled A9.

EXAMPLE 10

Substantially similar in all respect to that of Example 1 except that the mixture additive in the electrolyte includes about 6 grams of VC, about 10 grams of F-DEC and about 5 grams of 1,3-PS. In this example, the amount of VC is about 6% of the electrolyte by weight, the amount of F-DEC is about 10% of the electrolyte by weight, and the amount of 1,3-PS is about 5% of the electrolyte by weight. The lithium-ion battery produced is labeled A10.

REFERENCE 1

Substantially similar in all respect to that of Example 1 except that the mixture additive in the electrolyte includes about 3 grams of VC and about 2 grams of PS. In this reference sample, the amount of VC is about 3% of the electrolyte by weight and the amount of PS is about 2% of the electrolyte by weight. The lithium-ion battery produced is labeled B1.

REFERENCE 2

Substantially similar in all respect to that of Example 1 except that the mixture additive in the electrolyte includes about 2 grams of VC and about 4 grams of F-DEC. In this reference sample, the amount of VC about is 2% of the electrolyte by weight and the amount of F-DEC is about 4% of the electrolyte by weight. The lithium-ion battery produced is labeled B2.

REFERENCE 3

Substantially similar in all respect to that of Example 1 except that the mixture additive in the electrolyte includes about 3 grams of VC and about 4 grams of 1,3-PS. In this reference sample, the amount of VC is about 3% of the electrolyte by weight and the amount of 1,3-PS is about 4% of the electrolyte by weight. The lithium-ion battery produced is labeled B3.

REFERENCE 4

Substantially similar in all respect to that of Example 1 except that the mixture additive in the electrolyte includes about 3 grams of F-DEC and about 4 grams of 1,3-PS. In this reference sample, the amount of F-DEC is about 3% of the electrolyte by weight and the amount of 1,3-PS is about 4% of the electrolyte by weight. The lithium-ion battery produced is labeled B4.

The components and contents of the mixture additives (e.g., percentages of substances A, B and C) in the electrolytes of batteries A1-A10 (EXAMPLES 1-10) and batteries B1-B4 (REFERENCES 1-4) are summarized in Table 1.

TABLE 1

The components and contents of mixture additives in the electrolyte.

| | Total amount of additives | Substance A VC | Substance B F-EC | Substance B F-DEC | Substance C PS | Substance C 1,3-PS | Substance C ES |
|---|---|---|---|---|---|---|---|
| EXAMPLE 1 | 8 | 1.5 | 3 | | | 3.5 | |
| EXAMPLE 2 | 13 | 2 | 7 | | | 4 | |
| EXAMPLE 3 | 3 | 0.3 | 1.5 | | | 1.2 | |
| EXAMPLE 4 | 11.5 | 8 | 0.5 | | | 3 | |
| EXAMPLE 5 | 12 | 4 | 6 | | 2 | | |
| EXAMPLE 6 | 24 | 8 | 10 | | | 6 | |
| EXAMPLE 7 | 18 | 5 | | 3 | 10 | | |
| EXAMPLE 8 | 40 | 5 | 22 | | | 13 | |
| EXAMPLE 9 | 10 | 0.5 | 8 | | | | 1.5 |
| EXAMPLE 10 | 21 | 6 | | 10 | | 5 | |
| REFERENCE 1 | — | 3 | | | 2 | | |
| REFERENCE 2 | — | 2 | | 4 | | | |
| REFERENCE 3 | — | 3 | | | | 4 | |
| REFERENCE 4 | — | | | 3 | | 4 | |

Testing

1. Capacity Testing

At room temperature, batteries A1-A10 and B1-B4 are charged at 360 mA (0.5 C) to 4.2 V, charged at constant voltage of 4.2 V to cut-off current of 36 mA (0.05 C), and discharged at 360 mA to cut-off voltage of 3.0 V. The initial thicknesses and discharge capacities of the batteries are recorded in Table 2.

TABLE 2

Initial thicknesses and discharge capacities at about 360 mA (0.5 C).

| | Thickness/mm | Capacity/mAh |
|---|---|---|
| A1 | 5.30 | 731 |
| A2 | 5.30 | 730 |
| A3 | 5.36 | 725 |
| A4 | 5.36 | 723 |
| A5 | 5.33 | 729 |
| A6 | 5.48 | 710 |
| A7 | 5.39 | 712 |
| A8 | 5.53 | 706 |
| A9 | 5.42 | 716 |

TABLE 2-continued

Initial thicknesses and discharge capacities at about 360 mA (0.5 C).

| | Thickness/mm | Capacity/mAh |
|---|---|---|
| A10 | 5.41 | 708 |
| B1 | 5.46 | 715 |
| B2 | 5.36 | 715 |
| B3 | 5.38 | 712 |
| B4 | 5.39 | 710 |

2. High Temperature Storage Performance Testing

At room temperature, batteries A1-A10 and B1-B4 are charged at 360 mA (0.5 C) to 4.2 V, charged at constant voltage to cut-off current of 36 mA (0.05 C), and discharged at 360 mA (0.5 C) to cut-off voltage of 3.0 V. The initial thickness and initial capacity of each battery are noted. The batteries are maintained at about 85° C. in an oven for about 48 hours, removed, whereupon the thicknesses of the batteries are again noted. The change in thickness of each battery is recorded in Table 3.

The restoration capacity of each battery can be tested as follows: at room temperature, batteries A1-A10 and B1-B4 are charged at 360 mA (0.5 C) to 4.2 V, charged at constant voltage to cut-off current of 36 mA (0.05 C), and discharged at 360 mA (0.5 C) to cut-off voltage of 3.0 V. The charging/discharging steps are repeated three times whereby the third discharge capacity is the restoration capacity.

The calculations may be made using the following equations:

Capacity restoration rate(%)=(Restoration capacity/Initial capacity)×100%.

Changes in thickness (mm)=(Thickness after high temperature storage−Initial thickness)×100%.

TABLE 3

High temperature storage performance.

| | Capacity restoration rate (%) | Changes in thickness (mm) |
|---|---|---|
| A1 | 98% | 0.09 |
| A2 | 97% | 0.10 |
| A3 | 88% | 0.30 |
| A4 | 89% | 0.18 |
| A5 | 93% | 0.14 |
| A6 | 87% | 0.32 |
| A7 | 93% | 0.16 |
| A8 | 83% | 0.40 |
| A9 | 90% | 0.12 |
| A10 | 90% | 0.28 |
| B1 | 80% | 0.67 |
| B2 | 86% | 0.45 |
| B3 | 87% | 0.43 |
| B4 | 83% | 0.46 |

Based on the results of Table 3, the capacity restoration rates of batteries A1-A10 (EXAMPLES 1-10) were generally at about 90%, with the highest being at about 98% (battery A1), while the capacity restoration rates of batteries B1-B4 (REFERENCES 1-4) varied from about 80 to 87%, indicating that batteries incorporating presently disclosed electrolyte embodiments are more rugged and better able to return to its initial state than reference samples. In addition, the change in thicknesses of batteries A1-A10 (generally about 0.2 mm) were also smaller than those of batteries B1-B4 (generally about 0.5 mm) indicating the ability of these batteries to withstand thermal treatment without compromising physical structure.

3. Safety Performance Testing (a) Overcharging Performance

At room temperature, batteries A1-A10 and B1-B4 are overcharged at constant voltage and constant current to 12 V. The physical appearances of the batteries are recorded in Table 4.

TABLE 4

Overcharging performance.

| | State |
|---|---|
| A1 | Inflated and Anti-Exploding Indentation Activated |
| A2 | Inflated and Anti-Exploding Indentation Activated |
| A3 | Inflated and Anti-Exploding Indentation Activated |
| A4 | Inflated and Anti-Exploding Indentation Activated |
| A5 | Inflated and Anti-Exploding Indentation Activated |
| A6 | Inflated and Anti-Exploding Indentation Activated |
| A7 | Inflated and Anti-Exploding Indentation Activated |
| A8 | Inflated and Anti-Exploding Indentation Activated |
| A9 | Inflated and Anti-Exploding Indentation Activated |
| A10 | Inflated and Anti-Exploding Indentation Activated |
| B1 | Exploded and burnt |
| B2 | Exploded and burnt |
| B3 | Exploded and burnt |
| B4 | Exploded and burnt |

(b) Boiler Thermal Performance

At room temperature, batteries A1-A10 and B1-B4 are charged at 360 mA (0.5 C) to 4.2 V, charged at constant voltage of 4.2 V to cut-off current of 36 mA (0.05 C), the voltage being maintained at about 4.20 V±0.02 V. The batteries are subsequently placed in an oven with the temperature of the oven rising from room temperature up to about 150° C. at heating rates of about 3-7° C./min. The batteries are maintained in the oven for 10 minutes at about 150° C. if no anomalies are observed. The physical appearances of the batteries are recorded in Table 5.

TABLE 5

Boiler thermal performance.

| | State |
|---|---|
| A1 | Inflated and Anti-Exploding Indentation Activated |
| A2 | Inflated and Anti-Exploding Indentation Activated |
| A3 | Inflated and Anti-Exploding Indentation Activated |
| A4 | Inflated and Anti-Exploding Indentation Activated |
| A5 | Inflated and Anti-Exploding Indentation Activated |
| A6 | Inflated and Anti-Exploding Indentation Activated |
| A7 | Inflated and Anti-Exploding Indentation Activated |
| A8 | Inflated and Anti-Exploding Indentation Activated |
| A9 | Inflated and Anti-Exploding Indentation Activated |
| A10 | Inflated and Anti-Exploding Indentation Activated |
| B1 | Exploded and burnt |
| B2 | Exploded and burnt |
| B3 | Exploded and burnt |
| B4 | Exploded and burnt |

(c) Hotplate Thermal Performance

At room temperature, batteries A1-A10 and B1-B4 are charged at 360 mA (0.5 C) to 4.2 V, and charged at constant voltage of 4.2 V to cut-off current of 36 mA (0.05 C). The batteries are subsequently heated on a hot plate at about 250° C. The physical appearances of the batteries are recorded in Table 6.

TABLE 6

Hotplate thermal performance.

| | State |
|---|---|
| A1 | Inflated and Anti-Exploding Indentation Activated |
| A2 | Inflated and Anti-Exploding Indentation Activated |
| A3 | Inflated and Anti-Exploding Indentation Activated |
| A4 | Inflated and Anti-Exploding Indentation Activated |
| A5 | Inflated and Anti-Exploding Indentation Activated |
| A6 | Inflated and Anti-Exploding Indentation Activated |
| A7 | Inflated and Anti-Exploding Indentation Activated |
| A8 | Inflated and Anti-Exploding Indentation Activated |
| A9 | Inflated and Anti-Exploding Indentation Activated |
| A10 | Inflated and Anti-Exploding Indentation Activated |
| B1 | Leaking and Exploded and burnt |
| B2 | Exploded and burnt |
| B3 | Exploded and burnt |
| B4 | Exploded and burnt |

Based on the results of Table 4-6, batteries A1-A10 exhibited better overcharge and thermal performances, while batteries B1-B4 generally exploded and burned. As such, the lithium secondary batteries containing the electrolyte embodiments of the present disclosure have better thermal performance and ruggedness, and are in general safer than reference samples.

Although the disclosure has been described in detail with reference to several embodiments, additional variations and modifications exist within the scope and spirit of the disclosure as described and defined in the following claims.

What is claimed is:

1. An electrolyte comprising:
   a lithium salt;
   a solvent; and
   an additive, wherein the additive comprises substances A, B and C,
      wherein substance A is vinylene carbonate,
      wherein substance B has the chemical structure of at least one of

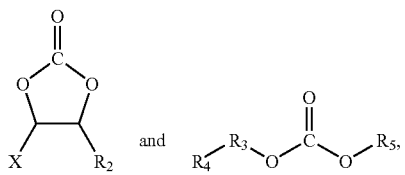

wherein $R_2$ represents a straight-chain alkane having the general formula $C_nH_{2n+1}$, wherein $0 \leq n \leq 3$,
   wherein $R_3$ represents a straight-chain alkane having the general formula $C_nH_{2n}$, wherein $1 \leq n \leq 4$,
   wherein $R_4$ represents a straight-chain alkane having the general formula $C_nH_{2n+1-a}Y_a$, wherein $0 \leq n \leq 4$,
   wherein $R_5$ represents a straight-chain alkane having the general formula $C_nH_{2n+1-b}Z_b$, wherein $0 \leq n \leq 3$,
   wherein X, Y and Z is selected from at least one of F and Cl,
   wherein a and b is greater than or equal to 0, but not equal to 0 at the same time, and
   wherein substance C includes at least 1,3 2-dioxathiane, 2-oxide, and wherein the amount of substance A can be from about 0.1% to about 10% of the electrolyte by weight, wherein the amount of substance B can be from about 0.5% to about 25% of the electrolyte by weight, and wherein the amount of substance C can be from about 1% to about 15% of the electrolyte by weight.

2. The electrolyte of claim 1, wherein the solvent includes at least two members selected from the group consisting essentially of ethylene carbonate, propylene carbonate, diethylene carbonate and γ-butyrolactone.

3. The electrolyte of claim 1, wherein the amount of additive can be from about 5% to about 40% of the electrolyte by weight.

4. The electrolyte of claim 1, wherein substance B is at least one of fluorinated ethylene carbonate, chloro-substituted ethylene carbonate, fluorinated diethylene carbonate and chloro-substituted diethylene carbonate, and wherein $R_2$=H, $R_3$=$CH_2$, $R_4$=$CH_3$ and $R_5$=$C_2H_4Z$.

5. The electrolyte of claim 1, substance B is fluorinated ethylene carbonate.

6. The electrolyte of claim 1, wherein the lithium salt includes at least one of lithium perchlorate ($LiClO_4$), lithium tetrafluoroborate ($LiBF_4$), lithium bis(oxalato)borate (LiBOB), and lithium hexafluorophosphate ($LiPF_6$).

7. A lithium battery comprising:
   a shell;
   a battery core disposed within the shell, wherein the battery core includes an anode, a cathode, and a separator disposed between the anode and the cathode; and
   an electrolyte, wherein the electrolyte comprises:
      a lithium salt;
      a solvent; and
      an additive, wherein the additive comprises substances A, B and C,
         wherein substance A is vinylene carbonate,
         wherein substance B has the chemical structure of at least one of

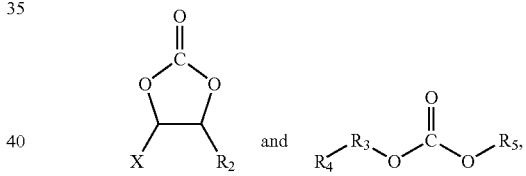

wherein $R_2$ represents a straight-chain alkane having the general formula $C_nH_{2n+1}$, wherein $0 \leq n \leq 3$,
   wherein $R_3$ represents a straight-chain alkane having the general formula $C_nH_{2n}$, wherein $1 \leq n \leq 4$,
   wherein $R_4$ represents a straight-chain alkane having the general formula $C_nH_{2n+1-a}Y_a$, wherein $0 \leq n \leq 4$,
   wherein $R_5$ represents a straight-chain alkane having the general formula $C_nH_{2n+1-b}Z_b$, wherein $0 \leq n \leq 3$,
   wherein X, Y and Z is selected from at least one of F and Cl,
   wherein a and b is greater than or equal to 0, but not equal to 0 at the same time, and
   wherein substance C includes at least 1,3 2-dioxathiane, 2-oxide, and wherein the amount of substance A can be from about 0.1% to about 10% of the electrolyte by weight, wherein the amount of substance B can be from about 0.5% to about 25% of the electrolyte by weight, and wherein the amount of substance C can be from about 1% to about 15% of the electrolyte by weight.

8. The battery of claim 7, wherein the solvent includes at least two members selected from the group consisting essentially of ethylene carbonate, propylene carbonate, diethylene carbonate and γ-butyrolactone.

9. The battery of claim 7, wherein the amount of additive can be from about 5% to about 40% of the electrolyte by weight.

10. The battery of claim 7, wherein substance B is at least one of fluorinated ethylene carbonate, chloro-substituted ethylene carbonate, fluorinated diethylene carbonate and chloro-substituted diethylene carbonate, and wherein $R_2$=H, $R_3$=CH$_2$, $R_4$=CH$_3$ and $R_5$=C$_2$H$_4$Z.

11. The battery of claim 7, substance B is fluorinated ethylene carbonate.

12. The battery of claim 7, wherein the lithium salt includes at least one of lithium perchlorate (LiClO$_4$), lithium tetrafluoroborate (LiBF$_4$), lithium bis(oxalato)borate (LiBOB), and lithium hexafluorophosphate (LiPF$_6$).

13. A method comprising:
producing an electrolyte for lithium-ion batteries by mixing a lithium salt and an additive to a solvent, wherein the additive comprises substances A, B and C,
wherein substance A is vinylene carbonate,
wherein substance B has the chemical structure of at least one of

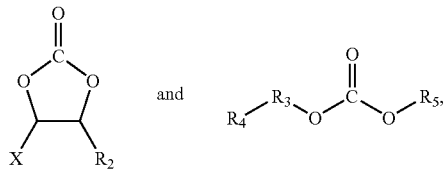

wherein $R_2$ represents a straight-chain alkane having the general formula $C_nH_{2n+1}$, wherein 0≤n≤3,
wherein $R_3$ represents a straight-chain alkane having the general formula $C_nH_{2n}$, wherein 1≤n≤4,
wherein $R_4$ represents a straight-chain alkane having the general formula $C_nH_{2n+1-a}Y_a$, wherein 0≤n≤4,
wherein $R_5$ represents a straight-chain alkane having the general formula $C_nH_{2n+1-b}Z_b$, wherein 0≤n≤3,
wherein X, Y and Z is selected from at least one of F and Cl,
wherein a and b is greater than or equal to 0, but not equal to 0 at the same time, and
wherein substance C includes at least 1,3 2-dioxathiane, 2-oxide, and wherein the amount of substance A can be from about 0.1% to about 10% of the electrolyte by weight, wherein the amount of substance B can be from about 0.5% to about 25% of the electrolyte by weight, and wherein the amount of substance C can be from about 1% to about 15% of the electrolyte by weight.

14. The method of claim 13, wherein the solvent includes at least two members selected from the group consisting essentially of ethylene carbonate, propylene carbonate, diethylene carbonate and γ-butyrolactone.

15. The method of claim 13, substance B is fluorinated ethylene carbonate.

16. The method of claim 13, wherein the lithium salt includes at least one of lithium perchlorate (LiClO$_4$), lithium tetrafluoroborate (LiBF$_4$), lithium bis(oxalato)borate (LiBOB), and lithium hexafluorophosphate (LiPF$_6$).

17. A method comprising:
producing a lithium secondary battery by:
situating a separator film between a cathode and an anode to form a battery core;
disposing the battery core within a shell;
injecting an electrolyte within the shell, wherein the electrolyte can be produced using the method of claim 15; and
sealing the electrolyte and the battery core within the shell.

* * * * *